Aug. 9, 1966 M. D. PARMENTER 3,266,049

EXAMINATION PAPER

Filed June 26, 1964 4 Sheets-Sheet 1

INVENTOR
MORGAN D. PARMENTER
BY Fetherstonhaugh & Co.
ATTORNEYS

Aug. 9, 1966 M. D. PARMENTER 3,266,049

EXAMINATION PAPER

Filed June 26, 1964 4 Sheets-Sheet 2

INVENTOR
MORGAN D. PARMENTER
BY Fetherstonhaugh & Co.
ATTORNEYS

Aug. 9, 1966 M. D. PARMENTER 3,266,049

EXAMINATION PAPER

Filed June 26, 1964 4 Sheets-Sheet 3

INVENTOR
MORGAN D. PARMENTER
BY Fetherstonhaugh & Co.
ATTORNEYS

Aug. 9, 1966 M. D. PARMENTER 3,266,049

EXAMINATION PAPER

Filed June 26, 1964 4 Sheets-Sheet 4

INVENTOR
MORGAN D. PARMENTER
BY Fetherstonhaugh & Co.
ATTORNEYS

United States Patent Office 3,266,049 Patented August 9, 1966

3,266,049

EXAMINATION PAPER

Morgan D. Parmenter, 56 Glencairn Ave., Toronto, Ontario, Canada

Filed June 26, 1964, Ser. No. 378,167
4 Claims. (Cl. 35—48)

This invention relates to a type of examination paper for giving a written test. It is concerned more particularly with the type of examination wherein a question is put to the candidate and a number of alternative answers are given. Only one of the answers is correct and the candidate selects the answer of his choice by making a mark in an appropriate place. The examiner judges the paper by checking for the location of the marks. The general method of marking an examination paper of this type by sensing a mark made in the correct location to indicate a correct answer is broadly bold. This invention is concerned with an examination paper having a convenient answer strip that can be detached therefrom after use by an examinee for marking in this fashion.

It is, therefore, an object of this invention to provide a convenient and compact form of examination paper having an answer strip that can be detached from the portion thereof carrying the questions for quick marking.

Generally speaking, the invention comprises a question and answer device having two question sheets in book form, the width of one sheet being less than the width of the other. The sheet having the smaller width has attached to its longitudinal edge a detachable answer strip upon which the answers to questions appearing on both sides of the question sheets can be indicated. The invention will be clearly understood after reference to the following detailed specification read in conjunction with the drawings.

Figures 3, 4:
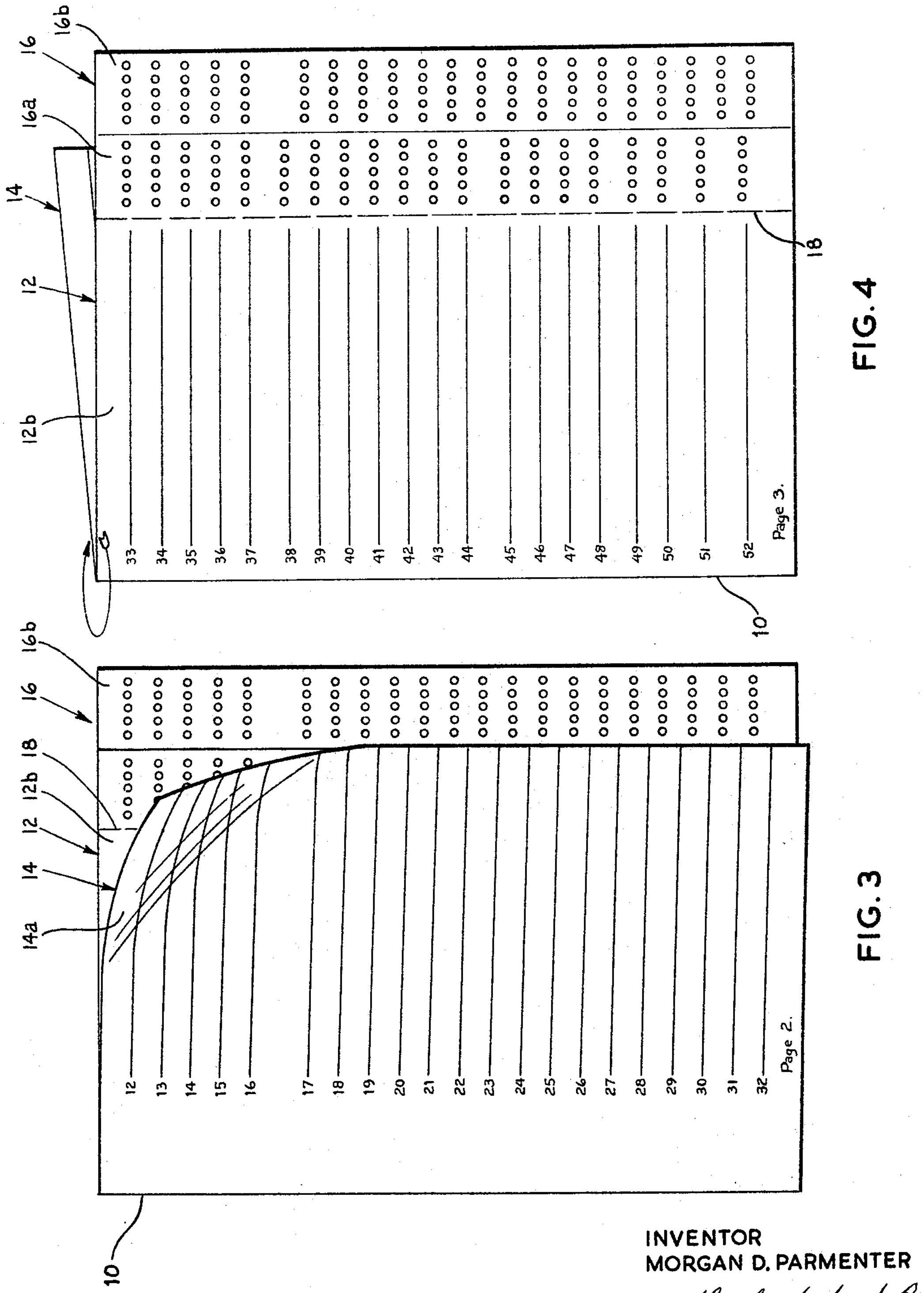
FIGURE 3 shows the form as viewed in FIGURE 2 folded about the fold line 10.
Figure 6:
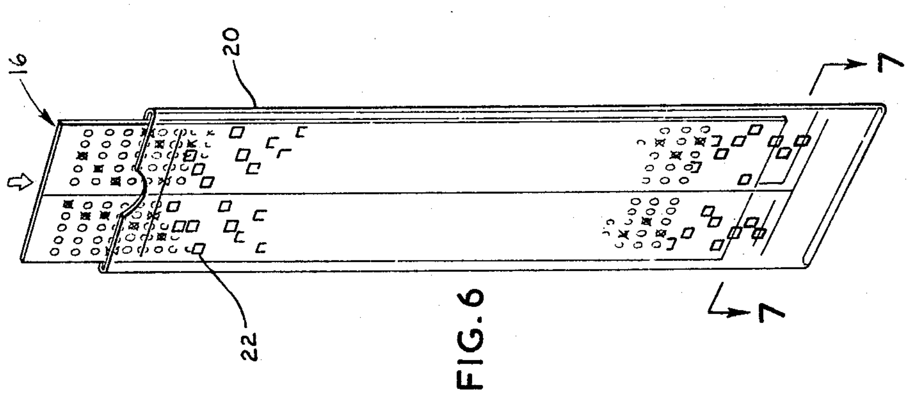
Figure 7:
Figure 5:
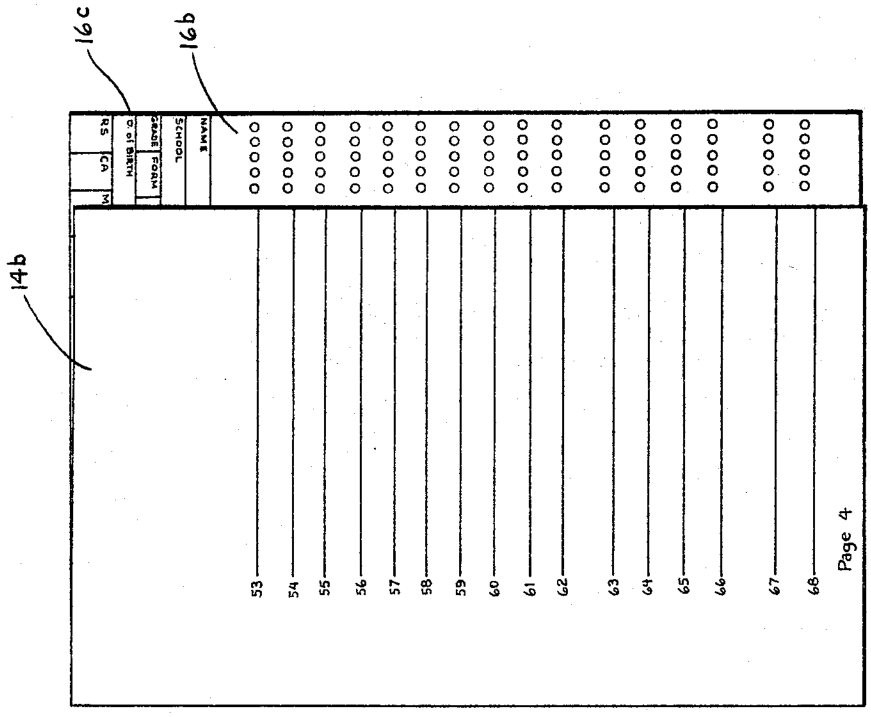

FIGURE 4 is a view illustrating the device when the sheet 14, as viewed in FIGURE 3, is folded about the fold line 10 through 360 degrees to expose the sheet 12;

FIGURE 5 shows the device as folded in FIGURE 4, but turned over to show a face 14*b* of the answer sheet 14;

FIGURE 6 is a view showing the manner in which the answer strip is corrected, and FIGURE 7 is a cross-sectional view along the line 7—7 of FIGURE 6.

Figure 1:
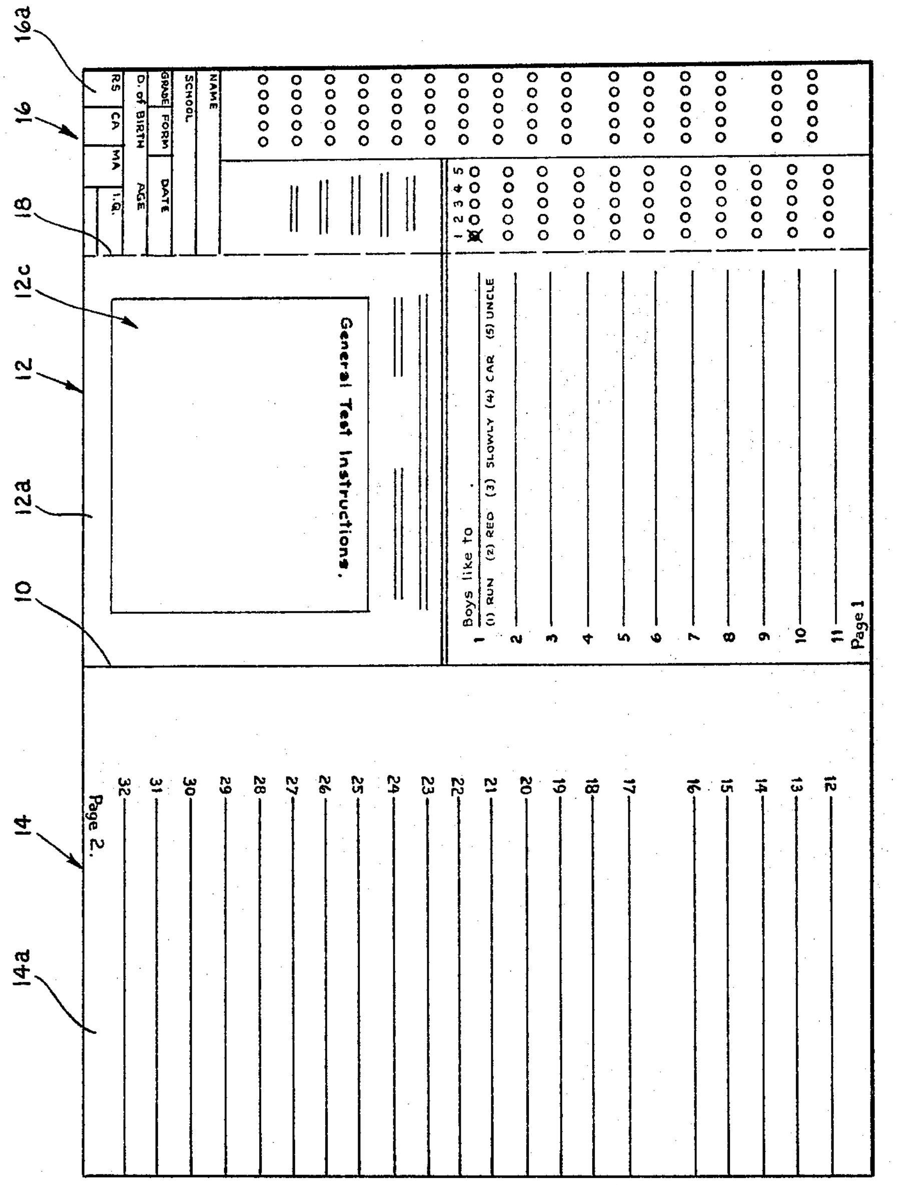
FIGURE 1 is a view of a paper blank from which an examination device according to this invention can be formed.
Figure 2:
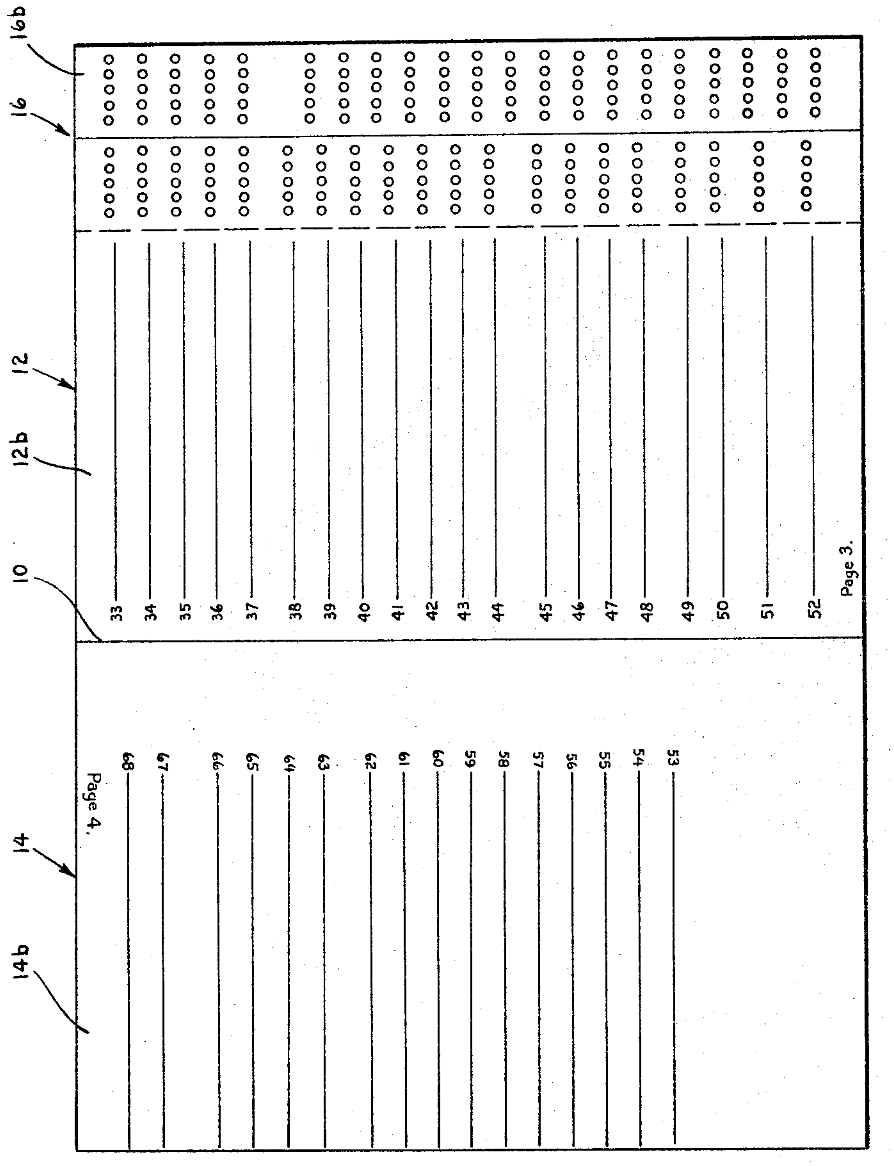
FIGURE 2 is a view of the other side of the blank, but turned top to bottom.

Referring to the drawings, the question and answer device there shown comprises a single blank of paper, as illustrated in FIGURES 1 and 2, folded about a fold line 10 to form a first question sheet, generally indicated by the numeral 12, and a second question sheet, generally indicated by the numeral 14, into book form, as illustrated in FIGURES 3, 4 and 5. The first question sheet has an answer strip, generally indicated by the numeral 16 detachably connected to its longitudinal edge by a weakened tear line 18.

Each face of each of the question sheets 12 and 14 has a series of questions printed on it. A plurality of possible answers, in this case four, to each question are printed underneath it and the examination candidate answers each question by selecting one of the four answers as being, in his opinion, correct and indicating this by marking a related space on the answer strip 16.

The first question sheet 12 has a first face 12*a*, the upper portion of which has a space, indicated by the numeral 12*c*, which carries general test instructions to the candidate. In this section, for example, the candidate will be told how to indicate his answers to questions and how to proceed from one page to the next until he has finished the test. The candidate will be told in this space that the questions start at number 1 on the first face 12*a* of the sheet 12 and are numbered upwardly. The first question only is indicated on the drawing by way of example. Similar questions correspond to each of the numbers on each face of the question sheets.

It will be noted that the first question comprises the statement "boys like to"; underneath the statment are five possible numbered answers. The candidate selects the proper answer to the question by number and then puts an "X" in the circle having a similar number on the answer strip 16. In the case of question No. 1, the correct answer is the word "run" and it is number 1. The examinee would then correctly put an "X" in the circle numbered 1 opposite that question on the answer strip 16, as indicated in the drawings.

As the examinee answers the questions on page 1, numbered 1 to 11, the sheet will be folded about the line 10 in book form to expose the first sheet of questions. When he comes to question No. 11 at the bottom of the page, he will be instructed to turn the booklet over without opening it, and to continue with question No. 12 on page 2. This is illustrated in FIGURE 3 of the drawings.

It will be noted that the width of the first question sheet 12, from its longitudinal edge where it joins with the answer strip 16 to the hinge line, is less than the width of the second question sheet 14, and that the answer strip 16 has a width greater than the difference in width between the first and second question sheets, so that answers to questions appearing on the second question sheet 14 can be marked on the portion 16*b* of the answer strip that extends beyond the second sheet 14 and, at the same time, answers to questions on the first question sheet can be marked on the portion 16*a* of the answer strip that does not extend beyond the second question sheet. Thus, if the correct answer to question No. 12 on the first face 14*a* of the second question sheet 14 were correctly indicated by the numeral 2, it would be marked by an "X" as indicated on the portion 16*b* of the answer strip 16.

When the candidate has completed the second page of questions at question No. 32, he is instructed at the bottom of the page, in writing, to fold that page along the fold line 10 at the left and to continue with question 33 on page 3. This is indicated in FIGURE 4 of the drawings. In this folded position, the candidate would indicate his answers to the questions on the portion 16*a* of the answer strip.

When the candidate reaches question No. 52 at the bottom of page 3, he is instructed to turn the booklet over without opening it and to continue with question No. 53 on page 4. This position of folding is indicated in FIGURE 5, and it will be noted that the answers will be placed on the outer portion 16*b* of the answer strip 16.

After completing the question No. 68, the candidate turns the paper upside down and enters his name and other statistics on the upper portion 16*c* of the answer strip.

Following this, the answer strip 16 is torn from the examination page on the weakened line 18 and sent for marking.

The marking of the test is done by sensing the correctness of the answers selected by the candidate as he placed the marks in the appropriate openings on the answer strip. A common and well known method of correcting answers in this fashion is to provide a master transparent checking device, generally indicated by the numeral 20. This device has a series of squares 22 marked on it, and when the answer strip 16 is appropriately placed in it, a correct answer is indicated by the appearance of a candidate's selection mark in a square 22 of the correcting device. This manner of marking examination papers of this type is not new, and no claim is made to it in this invention.

The essence of the present invention is the convenient and compact manner of providing an answer strip for a large number of questions that can be readily detached from the examination paper to which it relates and marked efficiently, as indicated in FIGURES 6 and 7.

Embodiments of the invention other than the one shown will be apparent to those skilled in the art, and it is not intended that the scope of this application should be limited thereby, other than the limitations expressed in the following claims.

What I claim as my invention is:

1. A question and answer device comprising a first question sheet having questions and alternative answers thereon, a second question sheet having questions and alternative answers thereon, an answer strip having spaces for answers to questions on said first question sheet and on said second question sheet, the correct answer being indicated by marking the proper space, said first question sheet and said second question sheet being hinged together at a hinge line to constitute a book form and each having a longitudinal edge, the width of each of said question sheets being from its respective longitudinal edge to said hinge line, the width of said first question sheet being less than the width of said second question sheet, said answer strip having a longitudinal edge joining with the longitudinal edge of said first question sheet, said answer strip having a width greater than the difference in width between said first sheet and said second sheet whereby answers to questions on said second question sheet can be marked on the portion of said answer strip that extends beyond said second question sheet and answers to questions on said first question sheet can be marked on the portion of said answer strip that does not extend beyond said second question sheet.

2. A question and answer device as claimed in claim 1, in which said answer strip is joined with said first question sheet as aforesaid in claim 1 along a weakened tear line whereby said answer strip can be readily detached from said first question sheet.

3. A question and answer device as claimed in claim 1, in which said answer strip has a width of twice the difference in width between said first sheet and said second sheet.

4. A question and answer device as claimed in claim 1 or claim 2 or claim 3, in which both sides of said first question sheet and both sides of said second question sheet have questions thereon.

No references cited.

EUGENE R. CAPOZIO, *Primary Examiner.*